Nov. 16, 1954  R. KAPP  2,694,249
MANUFACTURING METHOD FOR COMPLEX ELECTRICAL
AND WIRELESS APPARATUS
Filed April 12, 1949
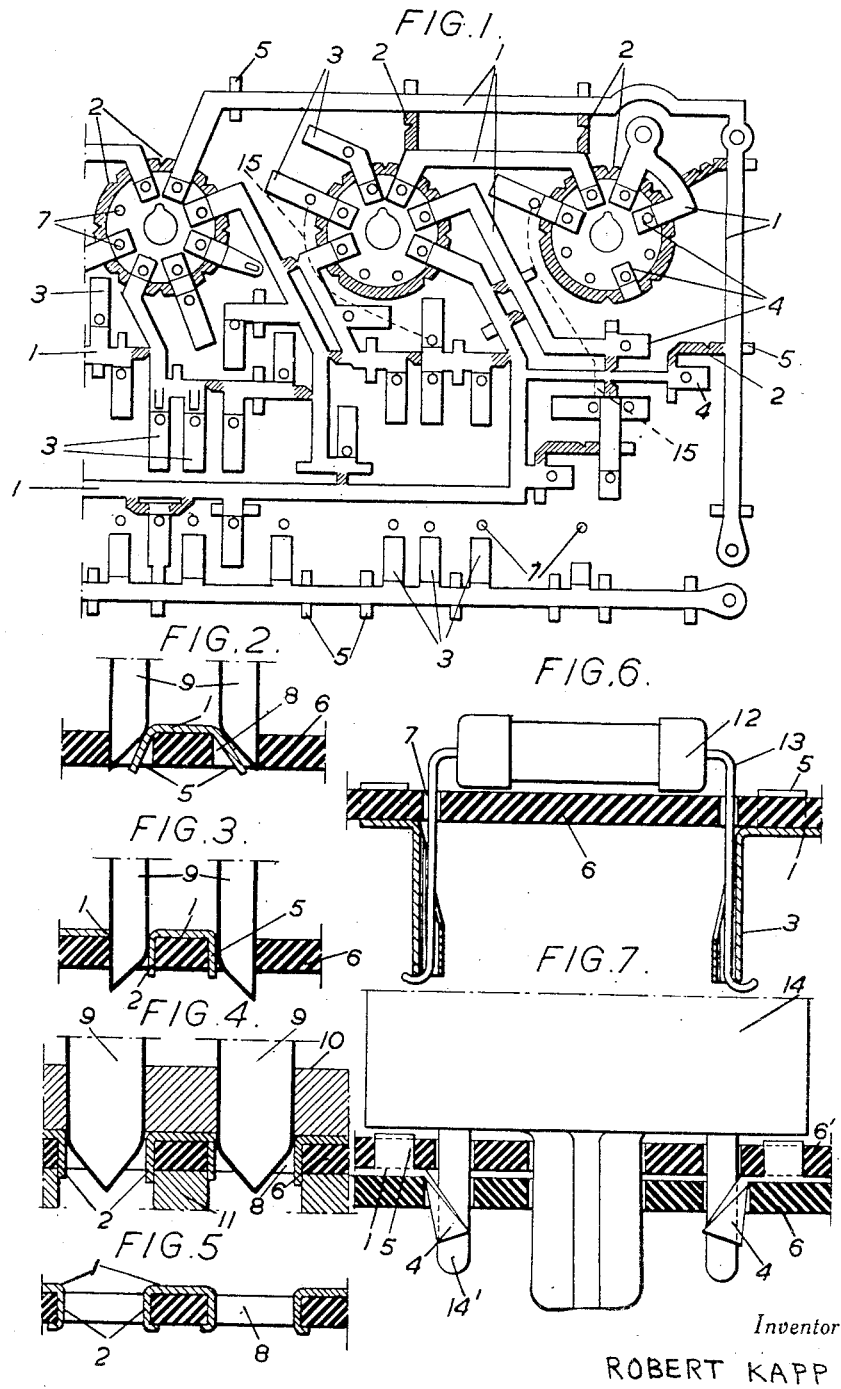
Inventor
ROBERT KAPP
By Wenderoth,
Lind & Ponack
Attorneys United States Patent Office 2,694,249
Patented Nov. 16, 1954

2,694,249
MANUFACTURING METHOD FOR COMPLEX ELECTRICAL AND WIRELESS APPARATUS

Robert Kapp, Strasbourg, France

Application April 12, 1949, Serial No. 87,016

Claims priority, application France April 16, 1948

2 Claims. (Cl. 29—155.5)

My invention refers to the manufacture of complex electrical apparatuses such as, for instance, wireless apparatuses, television sets, current rectifying equipments, amplifiers, etc.

In the manufacture of electric apparatuses of this kind that are provided, as a rule, with a large number of parts or components to be connected together by leads, the installation of the latter, denoted under the term "wiring," calls for numerous and expert workmen. This wiring consists, as a matter of fact, in joining together by wires, insulated as a rule, the various parts of the apparatus, these wires being soldered to lead eyelets or spade terminals with which the parts are furnished.

Proposals have already been put forward with the view of substituting methods of connection, that are simpler and quicker to execute, for the work of wiring.

So it is that, in a known method, these connections are carried out, on one or both surfaces of an insulating panel, by spraying of molten metal with the assistance of an oxyhydrogen pistol and of masks or stencils.

In another known method in which the connections are arranged also on one or both surfaces of an insulating panel, these connections are carried out from a thin sheet of metal located on the panel and with the help of a suitable cutting-out tool; the whole of the connections is cut out with a single pressing stroke, the edges of the strips of cut out material being simultaneously inlaid in the mass of the insulating panel.

Lastly there are available, for the execution of such connections, chemical or electro-chemical methods.

However, outside the installation of the connections properly so called, the wiring and the soldering of the parts or components of the apparatus on the panel thus furnished with all the requisite connections also takes up a serious percentage of man-power. On the other hand, special means, such as eyelets, contact-sockets etc., are often required for connecting, if necessary, the leads of one surface of the panel to those of the opposite surface. Now, the positioning of these eyelets, whether it is done by hand or by some mechanical means, involves a serious amount of work.

In order to trim out these inconveniences to a certain extent, steps have been taken up to the point of making up certain parts, such as fixed condensers and inductance-coils, by calling in the aid of the methods as disclosed above. These parts, arranged as an extension of the leads, are thus an integral part of the supporting panel.

This manner of procedure, that may be suitable for simple equipment, exhibits serious inconveniences for more complicated equipment, such as wireless apparatuses with a large number of vacuum tubes or valves and intricate wiring, since it forces, in the majority of cases, the scrapping of the whole panel, that is to say the main item of the apparatus if a single one of these parts becomes faulty.

The object of my invention is, on the one hand, to effect a very appreciable saving in man-power in the installation of the connections as well as in the wiring and the soldering of the parts of the apparatus and, on the other hand, to enable the faulty items to be easily replaced.

The manufacturing method that forms one of the objects of my invention, also has in view the arrangement of all the leads of at least a portion, for instance of the main portion, of the equipment or apparatus on one or both surfaces of an insulating panel, these connections being adapted however, so that, beside their function as conductors properly so called, they may be used for the removable parts, or as parts or portions of parts such as inductance-coils, condensers, commutator or switch contacts, etc. or else as supports for the fixed parts of the apparatus, the latter connections being adapted in such a manner that the attachment thereon of the connectors of said fixed parts may be achieved in one single operation (soldering for example) on all the attachment points.

In the method according to my invention use is made of at least one metallic grid comprising elements intended to constitute the leads on one of the surfaces of an insulating panel furnished with openings, temporary coupling bridges joining together the said elements until they are positioned on the panel, projections rigid with the said elements and intended to be used as contact means for the stationary and the removable parts of the apparatus and lugs rigid with the said elements and intended for the fastening of the latter on the panel. After the positioning of the grid on the panel, the temporary coupling bridges are sheared and certain portions of the sheared bridges and the fastening lugs are folded back in the openings of the panel, in order that the lead elements may be fastened to the said panel.

The grid is obtained to advantage by cutting out, in the press, of a metallic sheet and the lead elements correspond substantially to the outline of the wiring to be carried out. The grid may also be obtained by means of a photo-engraving method.

The shearing and folding back of the temporary coupling bridges as well as the folding back of the clips is carried out to advantage in the press, in one single operation.

An insulating panel is thus quickly obtained carrying leads separated from each other through the shearing of the coupling bridges.

According to the invention, the projections intended to be used as means of contact with the removable parts take a smaller length than those intended to be used as means of contact with the stationary or fixed parts, and the latter projections have such a length that, after having been bent substantially at right angles with respect to the plane of the grid, their ends (used for attachment and contact with the fixed parts) are all arranged in a plane substantially parallel to the grid and distant from the shorter projections.

The fastening of the fixed parts on the corresponding contacting projections is then carried out on the same plane in one single and common soldering operation.

It is as well to arrange as high a number as possible of parts or units on the same side of the lead panel. For a wireless receiving apparatus there will be placed, for instance, all the fixed resistances, all the fixed condensers, the valves and the medium frequency transformers as well as the tuning-in unit on the upper surface of the panel, the pre-positioned connections (grid elements) of the panel being on the lower surface thereof. The branch leads of these parts will go through holes arranged in the connection panel to join up, on the other side of the panel, with the projections bent at right angles and constituting the extension of the pre-positioned connections as disclosed above. In the same way, the leads located on the upper surface of the panel and that must join up with the leads located on the lower surface, will be furnished with extensions bent at right angles that pass through openings cut in the panel, and join up with the appropriate long projections of the lower leads.

All the parts of the apparatus are therefore arranged on one of the surfaces of the panel, preferably the upper one, while all the contact spots to be connected up by soldering are located on the other side of the panel in order to permit a single and common soldering operation.

When everything is positioned, all that has to be done is to dip in a horizontal manner all the contact places, first of all in a liquid pickling bath, and then in a molten solder bath so as to perform at one and the same time all the solderings to be carried out. As the contacts placed to be connected together by soldering extend more from the lower surface of the panel than the contacts in which are engaged the plugs of the removable parts of the electric apparatus, the latter contacts do not touch the pickling and soldering baths.

A further object of my invention also is the new article of manufacture that is formed by a metallic grid for the completion of a panel for electric leads, a grid provided with lead elements properly so called connected by temporary coupling bridges for the positioning of the said elements, lugs rigid with the said elements for fastening on an insulating support and projections, bent substantially at right angles with respect to the grid plane, to be used as contact means for the fixed and/or removable parts or as electrical units or unit parts such as inductance-coils, condensers, etc., the projections intended for connecting the fixed parts having a greater length than the projections intended for connecting the removable parts.

Finally another object of my invention is the new article of manufacture that is formed by an electrical apparatus of which at least one portion of the wiring is carried out from a metallic grid and through the putting into operation of the method specified hereinabove, said apparatus being characterized by the fact that the contact points of the wiring with the fixed parts of said apparatus are located at some distance from a connection supporting panel and substantially in a plane parallel to said panel.

The accompanying drawings illustrate as an example, a practical working up of the invention.

Fig. 1 is a plan view of a grid portion before it is fastened on an insulating support-panel.

Figs. 2 to 5 illustrate, on a larger scale, certain shearing operations of the bridge and folding-back operations for the fastening means.

Fig. 6 shows the fastening of a stationary unit or part on contact projections.

Fig. 7, finally, illustrates, a movable part or unit mounted on a connection panel.

The metallic grid obtained for example by cutting out in the press a grid as illustrated in plan in Fig. 1, comprises connectors 1, temporary bridges 2 intended to hold them together, projections 3 and 4 and lugs 5 intended to constitute respectively the connecting means for the stationary units parts of the apparatus, or the contact sockets for the removable units and the clamping members of the leads.

The outline as selected in the drawing, for instance, for the grid may be regarded as arbitrary and is not important as far as the representation of the method is concerned. The temporary bridges 2 may be recognized by fine hatching. The projections 3 and 4 grafted on the leads will be bent at a right angle and rolled over in the form of eyelets or sockets before the grid is positioned on the supporting panel 6 made of insulating material.

This panel is provided with holes 7 for the passage of the connecting wires of the fixed units or parts of the apparatus and, at the places where will be located the temporary bridges 2 and the lugs 5, openings 8, in which these parts are folded back to ensure the securing of the grid to the insulating panel.

Figs. 2 to 5 illustrate in section and on enlarged scale different places of the grid, where this operation is employed.

In Fig. 2, the dies 9 of the press tool only cause the folding back of the lugs 5 rigid with the lead members 1, in two openings 8 having substantially the same outlines and cut in the panel 6. After this folding back, the said lugs should come level with the opposite surface of the panel or slightly go beyond it. In this latter case, the protruding ends will be folded over on the said surface. In both cases, those lugs act after the manner of clamps ensuring the holding in position of the connector 1 on the insulating panel.

Fig. 3 shows a substantially identical operation carried out at right angles with a temporary bridge 2, on the one hand, and with a lug 5, on the other hand. In this case, the die 9 of the press tool is arranged so as to cut off first of all unilaterally the temporary bridge 2 of the connector 1 of which it ensured the coupling with the other parts of the grid. Then, this bridge is folded back just as the fastening lug 5 in the openings 8 arranged for this purpose cut in the insulating panel 6.

Fig. 4 illustrates the section of a spot, where two temporary bridges 2 will be severed in the middle and their two halves folded back into the subjacent openings 8.

Fig. 4 shows at the same time a modification of the press tool that is provided in this case with a press-plate 10 for guiding the dies 9 and pressing the panel 6 on the bottom tool 11 during the shearing and folding-back operation.

The portions of the temporary bridges 2 not essential for the fastening of the leads will be cut out at the time of this same operation.

Fig. 5 illustrates in section the same spot of the grid as Fig. 4 after the folding back of the protruding ends of the severed coupling bridges 2.

Obviously through the special fitting up of the press tool that is provided with as many dies as there are cuttings and fastenings to be made, all these operations are made through a single press stroke and, possibly, through a second stroke for the folding back of the protruding ends. There is thus at one and the same time the splitting up of the grid into a predetermined number of connectors, separated from each other and fastening of these connectors, as well as of contacting projections that are rigid with them, on the supporting panel.

Fig. 6 illustrates the putting into position of a fixed part or unit 12 of the electric apparatus on the supporting panel 6. The wires 13 of this part or unit go successively into the holes 7 of the panel and into the eyelets of the projections 3 rolled as spade terminals and after a cutting out beyond the projections, said wires are folded back, as illustrated, in order to ensure the keeping of the unit 12 in temporary position. The final coupling between this unit and the connections is effected by simultaneous soldering for all the units 12 to be inserted in the various circuits of the electric apparatus. For this purpose, the ends of the projections and the ends of connecting wires 13 are dipped first of all in the pickling bath, then in a bath of molten tin.

It will be readily understood that this joint soldering operation and the other steps of the method as disclosed enable a distinct saving to be made in man-power and, above all, in highly skilled labour and consequently securing an appreciable lowering in the net cost of electric equipments built up on these lines.

Fig. 7 illustrates the wiring of a removable part or unit 14 on the supporting panel 6. There is no question here of the use of a special stand or base fitted to the panel, but only of a duplication 6' intended to ensure a better guiding of the contact plugs 14' of the removable part 14 that are introduced in the holes 7 of the panel and then go into the contact-sockets as constituted by the projections 4 rolled over as eyelets. It will be observed that these sockets are much shorter than the projections 3. Thus, they will not be dipped in the tin-bath at the time of the soldering operation.

The adaptation, as disclosed hereinabove, of the method to the manufacture of a wireless receiving apparatus is obviously only one of the many adaptations to which this same method might be applied in the building up of other complicated electric equipments or apparatuses.

In certain cases, all or nearly all of the leads may be positioned on one single side of the supporting panel. In such cases, there will be no necessity of erecting two lead grids, one along being enough, while the second one may be replaced by one or more wire ends folded over in U-shape of which the parts curved at right angles will join up, for the soldering operation, with the side of the panel carrying the connection grid. The diagram illustrated in Fig. 1 allows such couplings 15 to be seen in dotted lines.

What I claim is:

1. In a method of assembling and manufacturing electrical apparatus provided with fixed and removable electrical circuit elements on one or both surfaces of a supporting insulating panel containing openings for engaging a system of connectors, coupling wiring and other electrical circuit elements, the steps comprising, forming a plurality of pre-cut connection strips, pre-cut temporary bridging strips to join some of said connection strips, connection strip projections and fastening lugs of uniform length adapted to secure the connection strips to the insulating panel and to make electrical contact with the connection strips, said connection strip projections being formed to one length for the removable connections and to a greater length for the soldered connections, bending the said projections prior to applying the circuit to said panel, fitting the formed strips, bridging strips and lugs to said panel so that the projections extend through the openings in said panel, simultaneously severing the bridging strips and bending the severed ends of the bridging strips and of the lugs into certain of the panel openings to thereby attach these to the panel, and thereafter lowering the assembly into a solder bath to immerse only the ends of the longer projections.

2. A method of manufacturing electrical apparatus as in claim 1 wherein certain of the connection strip projections are rolled in the shape of contact eyelets.

References Cited in the file of this patent

UNITED STATES PATENTS

| Number | Name | Date |
|---|---|---|
| 1,514,618 | Ide | Nov. 11, 1924 |
| 1,783,642 | Ferguson | Dec. 2, 1930 |
| 1,794,831 | Caruso | Mar. 3, 1931 |
| 1,939,130 | Mills | Dec. 12, 1933 |
| 2,023,517 | Creager | Dec. 10, 1935 |
| 2,312,181 | Matthews | Feb. 23, 1943 |
| 2,342,552 | Mallina | Feb. 22, 1944 |
| 2,431,393 | Franklin | Nov. 25, 1947 |
| 2,433,384 | McLarn | Dec. 30, 1947 |
| 2,441,960 | Eisler | May 25, 1948 |
| 2,451,725 | Franklin | Oct. 19, 1948 |
| 2,492,235 | Mitchell | Dec. 27, 1949 |
| 2,492,236 | Mydlil | Dec. 27, 1949 |
| 2,502,291 | Taylor | Mar. 28, 1950 |